May 12, 1970 M. I. SMOKLER 3,511,993

ACQUISITION SYSTEM

Filed March 18, 1966 2 Sheets-Sheet 1

INVENTOR.
MELVIN I. SMOKLER

BY [signature]

[signature]

ATTORNEYS

INVENTOR.
MELVIN I. SMOKLER
BY
Roy Miller
ATTORNEYS 3,511,998
Patented May 12, 1970

3,511,998

ACQUISITION SYSTEM

Melvin I. Smokler, Van Nuys, Calif., assignor, by mesne assignments, to the United States of America as represented by the Secretary of the Navy Continuation-in-part of application Ser. No. 269,237, Mar. 28, 1963. This application Mar. 18, 1966, Ser. No. 536,949
Int. Cl. H04b 9/00
U.S. Cl. 250—199 15 Claims This invention relates to a method and means for establishing initial transmission between two or more communication equipments and is a continuation-in-part of copending application Ser. No. 269,237, filed Mar. 28, 1963.

Figure 1B:
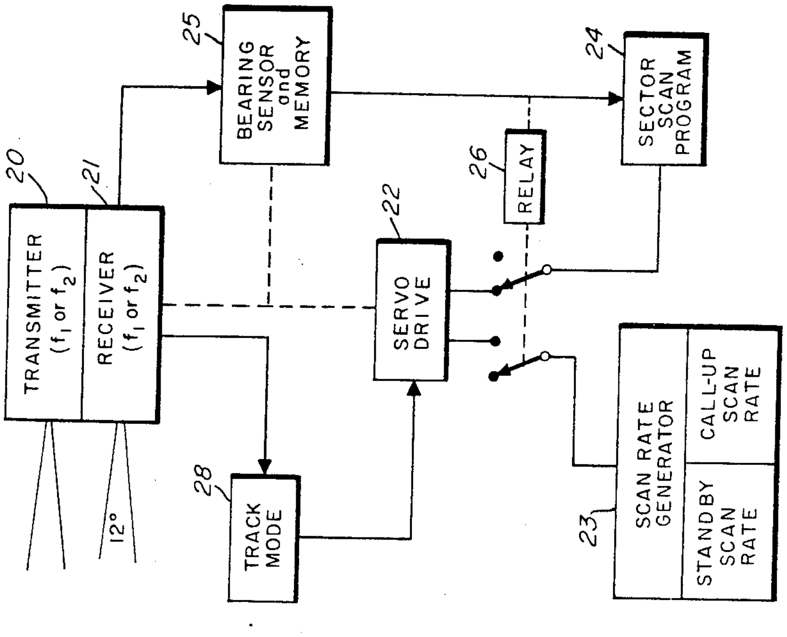

In general, the task of establishing transmission between two or more small-angle communications equipments is a difficult one because of the absence of wide angle or omnidirectional radiation of energy by means of which such transmission contact can be initiated. Moreover, in the types of operation where the transmission is between small-angle equipments which may be mobile, such as on ship or aircraft, there is no known or established point, bearing, or area in which transmission may be directed or reception anticipated to initiate contact between two or more such equipments.

Thus, in a communication system which is both small-angle in nature and involves equipments which are mounted in a mobile manner, the problem of two or more such equipments initiating and maintaining communications is complicated by the fact that all such equipments must literally scan all space in which any other of the communications equipments can possibly appear, in order to initiate transmission and reception between the equipments. The nature of small-angle communication systems is such that the equipments must be observing each other at the same time in order to establish communications. Thus, the problem is considerably more complex than the situation involving communications equipments where at least one of the equipments is capable of transmitting and/or receiving omnidirectional radiant signals.

Those skilled in the art will appreciate that it is possible for two small-angle communication equipments which are seeking acquisition of each other for initiating and establishing communications therebetween, to be operative in such a manner that the acquisition of each other and initiation of communication therebetween would take an indefinite length of time. As a matter of fact, if two such equipments were arranged so that one was transmitting and the other was receiving, and both rotationally operative at the same rotational speed but in such a manner that they were never directed at each other at the same instant of transmission and reception by the respective equipments, it can be envisioned by those knowledgeable in the art, that communication therebetween literally never be established. This, of course, is the extreme case requiring an indeterminate time to establish communication between two such small-angle communication equipments.

Accordingly, it is a prime object of the invention to provide a method and means for initiating communication between two small-angle communication equipments in a predetermined and established maximum time.

It is a further object of the present invention to provide such a communication system in which each of the cooperating equipments is capable of transmitting and receiving radiant energy at first and second predetermined frequencies.

Another object of the present invention is to provide a communication system in which the equipments may be operated in a "call-up" mode so as to transmit one of two predetermined frequencies while other of the equipments may be operated in a "stand-by" mode wherein those latter equipments are arranged to receive only the transmitted frequency of the equipment operating in the call-up mode.

Yet another object of the present invention is to provide a communication system in which two separated small-angle communication equipments at locations unknown to each other are arranged for one equipment to be driven through its receiver solid angle of view in the same period a remote transmitting equipment is driven through the solid angle of a sphere, so that transmission contact is completed between the separated equipments in a period of time not exceeding the full period of scan of the receiving equipment.

A further most important object of the present invention is to establish a maximum time in which two small-angle communication equipments must make transmission contact with each other, by arranging that one such equipment is rotated through its receiver field of view during the period that the transmitting equipment is rotated through a full rotation of three hundred and sixty degrees.

A further object of the present invention is to provide such a communication system which includes means responsive to the initial signals transmitted between the equipments for recording the relative bearing therebetween.

A still further object of the present invention is to provide such a communication system which is responsive to signals transmitted between two or more equipments for causing the equipments to operate within a predetermined oscillatory sector scan substantially centered about the recorded relative bearing between such equipments.

Yet a further object of the present invention is to provide a communication system in which the tracking mode of operation for transmitting intelligence between two or more such equipments is accomplished with a reduced receiver field of view whereby to improve the signal-to-noise ratio without lengthening the acquisition time required to initiate communication between such equipments.

In its most fundamental form the communications system of the present invention comprises at least one equipment for transmitting radiant energy within a small angle and at a determinable frequency, and at least one related equipment for receiving the transmitted radiation within a relatively limited angle of view. Thus, the communication system of the present invention is particularly adapted and designed for use with what has been termed in the art as small-angle communications systems. Appropriate drive means are provided in each equipment, driving and directing both the transmitting and receiving means inasmuch as in such small-angle equipment, particularly when mobile mounted, there is the fundamental problem of each equipment searching for the associated equipments of the system in a scan of all the space in which the other equipment may appear. Assuming surface mobile equipments, in accordance with the concept of the present invention the transmitting equipment is caused to rotate at a speed which is in the same ratio to the speed of rotation of the receiving equipment as the ratio of three hundred and sixty degrees to the angle of view of the receiver. This may be stated in another way i.e., that the transmitting equipment is rotated through one complete revolution in the same period of time that the receiving equipment is driven through its limited angle of view. Thus, in either statement of the relationship required by the concept of the present invention, transmission contact between the two equipments is assured within a period of time which is not in excess of one full rotational period of the slower of the two rotational speeds; that is to say, one full rotational period of the receiving equipment as described herein.

Thus, in a typical small-angle communication system in which the limited field of view of the receiver may be twelve degrees, for example, the rotational speed of the receiver may be one revolution per minute, whereas the rotational speed of the transmitting equipment must be thirty revolutions per minute. There is no inherent rotational speed limitation within the concept of the present invention as to the necessary ratio relationship as established and described above. However, those knowledgeable in the art will appreciate that there are certain practical limitations on the rotational speeds at which communications equipment can effectively be operated without undue wear or involvement with ancillary problems. Thus, in the example given where the transmitting equipment is revolving at thirty revolutions per minute and the receiving equipment is revolving at one revolution per minute (the receiving equipment having a limited field of view of approximately twelve degrees), the two equipments are bound to be directed at each other within a period of one minute i.e., the period of one full revolution of the slower rotating of the two equipments or the receiving equipment as described herein for illustrative purposes.

In the more general case where separated equipments are disposed at locations unknown to ach other and must scan in the vertical as well as the horizontal plane, for example, one equipment is caused to be driven through its receiver solid angle of view in the same period a remote transmitting equipment is driven through the solid angle of a sphere. The driven speed ratio of the equipments is thus a function of the ratio of $4\pi$ steradians to the solid angle of the field of view of the receiver in steradians.

In either the general case or the specific case limited to one plane of search, in accordance with the concept of the present invention, upon the establishment of initial contact between two such equipments, the relative bearing is caused to be recorded and the equipments are simultaneously caused to enter upon an oscillatory sector scan mode of operation in which each of the equipments oscillates back and forth over a limited sector scan centered substantially about the recorded bearing of each equipment relative to the other. In this manner, slight overshoot of the rotating equipments or relative movement of vessels or aircraft with respect to each other are taken into account so that the bearing information obtained during initial contact between the two equipments is not lost by the continuing change of relative between two mobile equipments.

The sector scan thus initiated maintains relative bearing conditions to complete acquisition between both equipments. The characteristic dwell time of the transmitted signal upon the receiver during the oscillatory sector scan mode of operation can be discriminatingly detected by appropriate means which then causes the equipment to enter into a closed-loop servomechanism controlled track mode of operation so that each of the equipments tracks each other, during which intelligence communication between the two equipments may be maintained. Such intelligence communication may typically take the form of voice communication.

Further, in accordance with the concept of the present invention, the angle of view of the receiver is diminished during the track mode of operation so as to improve the signal-to-noise ratio during broadband intelligence communication. Those skilled in the art will appreciate that in the acquisition modes of operation, two or more such communication equipments may be transmitting purely tone signals permitting relatively narrow bandwidth operation so that a comparatively high signal-to-noise ratio can be realized. Thus, the angle of view of the receiver can be enlarged within practical limits to avail of the minimum acquisition time inasmuch as, the larger the angle of view of the receiver, in accordance with the concept of the present invention, the smaller the rotational ratio of the cooperating equipments; consequently, with the same physical parameters and limitations, the higher rotational speed of the receiving equipment permits a commensurately shorter rotational period, which it will be recalled is determinative of the maximum acquisition time for establishing and initiating transmission between the equipments.

These and other features, advantages and objects of the present system will be appreciated from the description of an embodiment of the present invention as illustrated in the accompanying drawings and the explanation of its operation in accordance with the concept and spirit of the present invention.

Figure 1A:
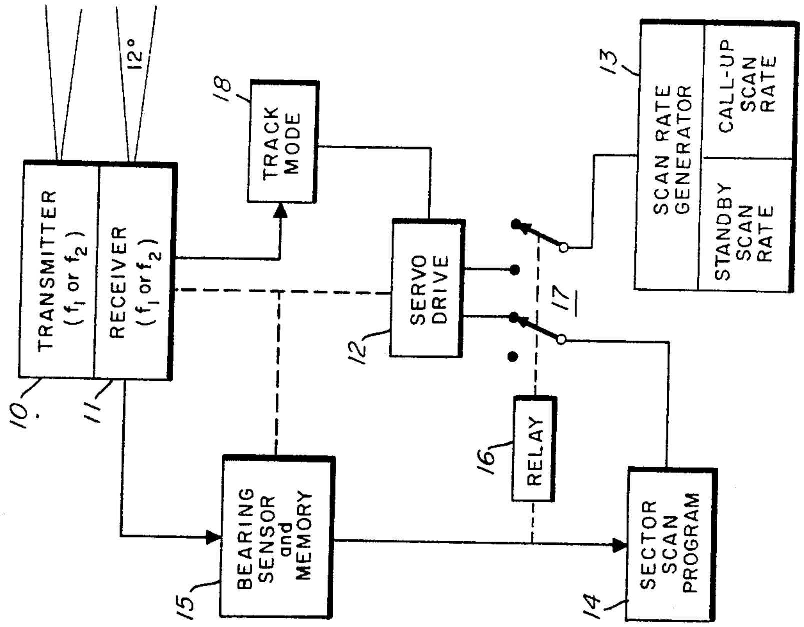

In the drawings:

FIG. 1*a* is a schematic block diagram of one equipment which may be employed within the concept of the present invention; and FIG. 1*b* is a schematic block diagram of an identical equipment which may be employed within the concept of the present invention to cooperate with the schematically illustrated combination of equipment of FIG. 1*a*.

Figure 2:
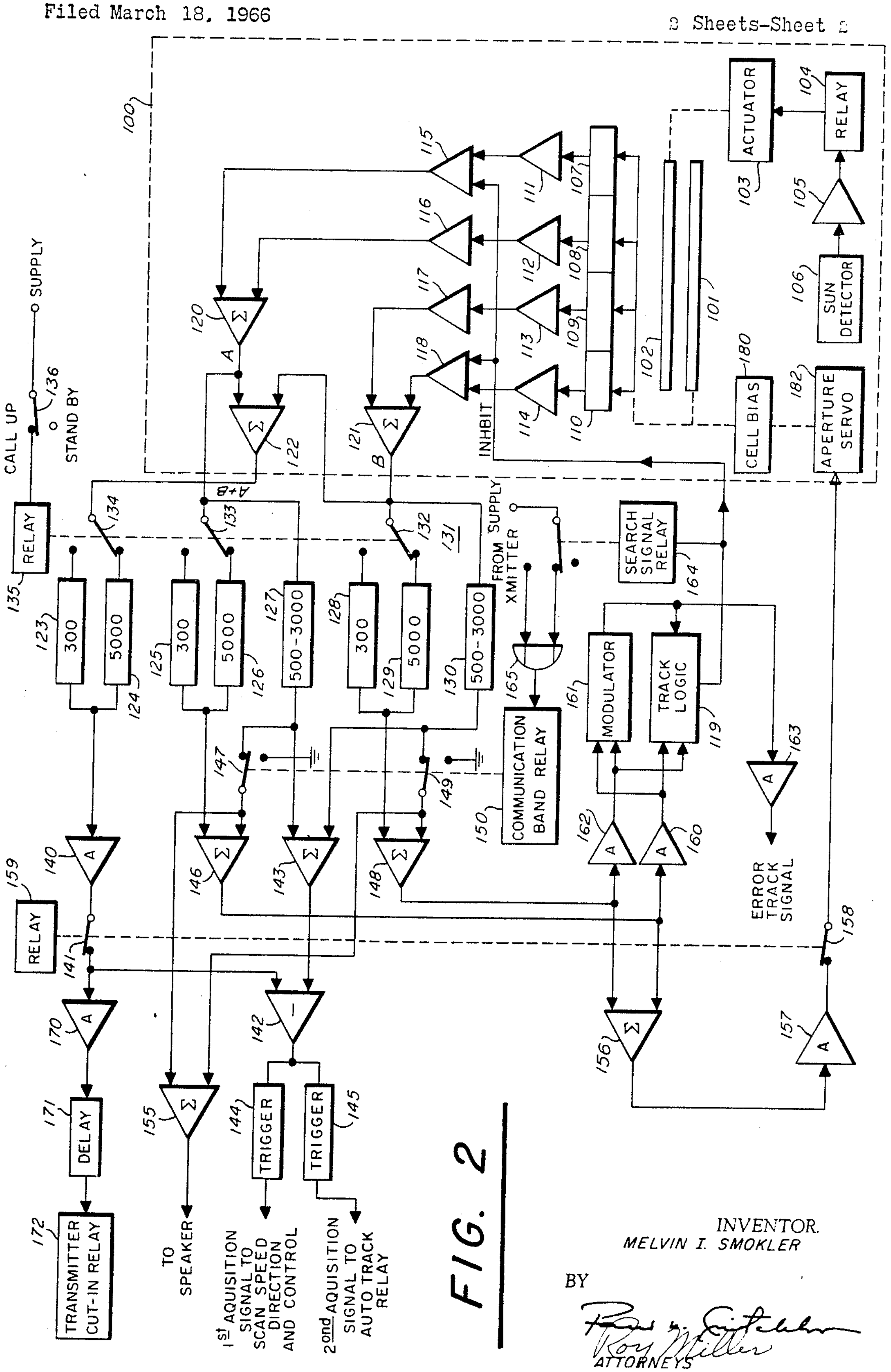

FIG. 2 is a schematic diagram illustrating transmitter and receiver controls employed in equipment of an optical communications system embodying the concept and teaching of the present invention.

It will be appreciated by those knowledgeable in the art that any number of such cooperating equipments may be employed within the spirit and concept of the present invention. However, for the purposes of clarity, simplicity, and ease of illustration, a typical operation will be explained including the initiation of communicating contact between the equipments illustrated in FIGS. 1*a* and 1*b* only. In the communications equipment illustrated in FIG. 1*a* a relatively small-angle transmitter 10 and a receiver 11 are arranged and mounted physically on a common base or platform so that they will be caused to rotate together by means of a servo drive as indicated at 12. The servo drive 12 is mechanically linked to drive the transmitter and receiver and in a typical equipment, the transmitter 10 and the receiver 11 may be aligned so that the transmitting angle and receiver field of view are arranged to be parallel and thus rotate in unison and are pointing in the same direction at any given instant of time. The servo drive 12 is actuated in response to an input which may be derived either from a scan rate generator 13, a sector program storage means 14 or a track mode generator 15. In a typical operation, the scan rate generator 13 may initially be manually set so as to feed a stand-by rate into the servo drive. The stand-by scan rate will be determined by the physical parameters and limitations imposed on the particular equipment employed, as well as the fundamental consideration of the ratio established within the concept of the present invention by reason of dividing the receiver field angle of view into three hundred and sixty degrees. Assuming that the receiving angle of view is twelve degrees, as indicated graphically in FIG. 1*a*, the ratio of rotational speeds of the transmitting communication equipment to the remote receiving communication equipment would thus be thirty one. For purposes of explanation therefore, if it is practical to operate the transmitting communication equipment (as represented by the equipment of FIG. 1*b*) at the rate of thirty revolutions per minute, the transmitter and receiver equipment of FIG. 1*a* (operating as the receiver in the stand-by mode of operation) would be rotated at one revolution per minute.

Thus, in accordance with the concept and the teaching of the present invention, the maximum time for establishing communications initially between two such equipments would be a period not exceeding one minute or, in other words, not exceeding the time required for one complete revolution of the slower rotation of the two equipments, which in this case has been established as the equipment of FIG. 1*a* for illustrative and explanatory purposes. Upon reception by the equipment of FIG. 1*a* of a signal from the equipment of FIG. 1*b*, the receiver 11 transmits a signal to a bearing sensor and memory means 15 which senses and records the bearing of the one communications equipment relative to the other. It is to be noted that the bearing sensor memory 15 is mechanically linked (as indicated schematically by the dash lines) to the servo drive 12 so as to be rotated commensurately with the instantaneous disposition of the transmitter 10 and the receiver 11 in response to the servo drive 12.

The bearing sensor and memory means 15 transmits an appropriate signal to the sector scan program 14 wherein a predetermined and selectable program is stored which is adapted to cause the servo drive 12 to drive in an oscillatory sector scan within selected limits. The signal from the bearing sensor memory means 15 actuates an appropriate means, which may take the form of a relay as indicated at 16, to actuate the switch means 17, thereby disconnecting the signal generated by the scan rate generator 13 from the servo drive 12 and impressing upon the servo drive 12 the signals stored in sector program 14. The signal representative of the detected relative bearing between the two equipments is included with the programmed signal impressed upon the servo drive 12 by the sector scan within an oscillatory selected predetermined sector centered about the relative bearing substantially as detected between the two communicating equipments by reason of their initial signal contact with each other.

Concurrently with the equipment of FIG. 1*a* entering upon the sector scan mode of operation, the transmitting equipment of FIG. 1*b* is caused to enter upon a sector scan mode of operation analagous to that previously described in connection with the operation of the equipment of FIG. 1*a*. The receiver 11 thus receives a signal from the transmitter 20 of the equipment of FIG. 1*b* which has a distinctive dwell time upon the receiver field of view due to the slow speed of one equipment relative to the other when both equipments are in the sector scan mode of operation. Such dwell time is discriminatingly responded to by an appropriate means included in the track mode element 18 which, upon detecting such distinctive dwell time signal, causes the servo drive 12 to enter upon a track mode of operation that is essentially and substantially a closed loop servo mechanism mode of operation responsive to the usual type of error signal as caused by relative angular movement between the two communicating equipments.

The equipment illustrated in FIG. 1*b* is substantially identical to that illustrated in FIG. 1*a*. As illustrated, a transmitter 20 is mounted in alignment with a receiver 21 so that both the transmitter 20 and the receiver 21 are arranged to be driven by an appropriate servo drive means 22. Both the transmitter 20 and the receiver 21 are of the relatively small angle type; that is to say, that neither is capable of transmitting or receiving in an omnidirectional manner but rather only through a small angle of acceptance in the receiver such as the twelve degrees illustrated schematically and a relatively small angle of transmission of radiant energy from the transmitter 20. As is the case with the equipment illustrated in FIG. 1*a*, the communications equipment illustrated in FIG. 1*b* in adapted and arranged so that the servo drive element 22 may receive an appropriate selectable scan rate signal from the scan rate generator 23. The selection of the "stand-by" scan rate (which is the slower rotational rate of scan) or the "call-up" scan rate (which is the more rapid rotational rate) may be made by manual selection of an operator, for instance.

A sector scan program means 24 is provided and arranged to be connected to furnish an appropriate signal to cause the servo drive means 22 to scan through an oscillatory sector. In response to an appropriate signal from the bearing sensor and memory means 15, a relay 26 or other appropriate means is actuated to disconnect the scan rate generator 23 from the servo drive means 22 and to establish connection between the sector scan program means 24 and the servo drive means 22. The switch means 27 which is operated by the relay 26 is illustrated schematically in its alternate positions of connection as shown by the dash line arrows.

In the same manner as the communications equipment illustrated in the FIG. 1*a*, the combination of communications equipment illustrated in FIG. 1*b* includes a track mode means 28 which is responsive to a particular signal from the receiver 21 to cause the servo drive 22 to be driven in a track mode of operation. The track mode of operation is substantially a closed loop servomechanism drive responding to the error signal as detected by change of relative direction between the two communicating equipments, such as is illustrated in FIGS. 1*a* and 1*b* These equipments, it will be remembered, were described as being movably mounted, such as on ships or aircraft, for instance.

SYSTEM OPERATION

It should be noted that the transmitter 10 and the receiver 11 of the communications equipment illustrated in FIG. 1*a*, as well as the transmitter 20 and the receiver 21 illustrated in the communications equipment of FIG. 1*b*, both are indicated to be capable of operating at two frequencies, *f*1 or *f*2. As the system is conceived to operate, two basic modes of operation called the "stand-by" mode and the "call-up" mode are provided for within the capabilities of the equipments.

For purposes of simplicity and clarity of understanding the cooperative manner of operation of just two equipments such as those illustrated in FIGS. 1*a* and 1*b* will be explained. However, it should be borne in mind that an overall communication system as conceived by the present invention may consist of a great many more communications equipments, such as twenty, thirty or more combinations of equipment substantially identical to those illustrated in FIGS. 1*a* and 1*b* and having basically the same capabilities and modes of operation.

For purposes of illustration it shall be assumed that the communications equipment of FIG. 1*a* is operated in a stand-by mode; that is to say, that it is waiting to be contacted by other communications equipment within the system, but that it is not presently desired such contact be initiated on the part of the equipment illustrated in FIG. 1*a*. In the stand-by mode of operation, the scan rate generator 13 will feed a signal to the servo drive 12 causing it to physically drive the transmitter 10 and the receiver 11 at a relatively slow rotational rate which may be one revolution per minute, for instance, in a typical equipment embodying the present invention. In the stand-by mode of operation, the transmitter 10 of the communications equipment illustrated in FIG. 1*a* will transmit only frequency *f*1, whereas the receiver 11 will respond only to frequency *f*2 through suitable discriminatory filter means, for instance.

The concept of the present invention contemplates that other communications equipments arranged to operate within the system, such as the communications equipment illustrated in FIG. 1*b*, when operating in the call-up mode of operation, for instance, will generate a relatively high scan rate signal to cause the servo drive mechanism 22 to drive the transmitter 20 and the receiver 21 at a relatively high rate of rotation such as thirty revolutions per minute. It will be recalled that the assumed receiver angle of acceptance is twelve degrees and the concept of the present invention requires that the ratio of relative rotational speeds of the transmitting and receiving equipments be substantially that determined by dividing the angle of acceptance of the receiver of the receiving equipment in stand-by mode into three hundred and sixty degrees. Therefore, the assumed twelve degrees angle of acceptance of the stand-by mode receiver 11 divided into three hundred and sixty degrees gives a thirty-to-one ratio.

This ratio then, within the spirit and teaching of the present invention, is the established ratio of rotational speed of the transmitter 20 and receiver 21 with respect to the rotational speed of the transmitter 10 and the receiver 11 which, as has been explained, is the communications equipment of FIG. 1*b* operating in the call-up mode of operation in cooperative co-action with the communications equipment illustrated in FIG. 1*a* which is assumed to be operating in the stand-by mode of operation. Conversely to the operative mode of the transmitter 10 and the receiver 11, the transmitter 20 of the call-up communications equipment is caused to transmit frequency *f*2 and to respond only to frequency *f*1. Therefore, within one complete rotation of the transmitter 10 and the receiver 11, initial communication will be established between the two equipments, and in the manner previously described in connection with FIG. 1*a*, the communications equipment of FIG. 1*b* will be caused to enter into the sector scan mode of operation and thereafter the track mode of operation.

In the overall system concept it will be appreciated that when both equipments or all equipments within the system are operated in the stand-by mode of operation, they would all be transmitting frequency *f*1 and all capable of responding only to frequency *f*2; therefore there will be no communication between such equipments when they are all in the stand-by mode of operation which is consistent with the requirements of a communications system of the present invention.

On the other hand, where one or more of the equipments in the system are caused to operate in the call-up mode of operation, they are caused to transmit and receive the converse arrangement of frequencies; that is to say, they may transmit frequency *f*2 and respond to received frequency *f*1 so that contact between the equipments is established as has been previously described. When the equipments have reached the track mode of operation with respect to each other, intelligence may be communicated as by voice, for instance, and in this mode of operation it is highly desirable to have the most favorable signal-to-noise ratio in order to achieve the maximum useable range. This is accomplished within the concept and teaching of the present invention by reducing or diminishing the field of acceptance of the respective receivers involved. For instance, if the field of acceptances signal is reduced from twelve degrees to six degrees, the signal-to-noise ratio will be improved significantly for the broader bandwidth communication required for voice, for instance, as contrasted to the previously described method and system of acquistion of one of the communicating equipments by the other.

As a practical matter, the maximum useable range of the communications equipments as conceived by the system of the present invention is largely determined by the broad bandwidth communications range such as voice communications, for example. Accordingly, it is desirable to have a broader angle of acceptance of signal when the equipments are operating in an acquisition mode because in such acquisition mode substantially fixed frequency tone signals such as *f*1 and *f*2 are used which do not require a broad bandwidth; consequently, narrow bandwidth filters can be used in the receiver to achieve a satisfactory signal-to-noise ratio. However, those knowledgeable in the art will appreciate that with the larger angle of acceptance of the receivers, the ratio of rotational speeds between two equipments in the standby and call-up modes of operation, respectively, is significantly reduced as, for instance, by one-half if the angle of acceptance of the receivers is varied from twelve degrees to six degrees as previously described for illustrative purposes.

Further, it will be appreciated that such a lesser ratio between rotational speeds will enable a faster rotational scan rate by the communications equipments operating in the stand-by mode without increasing the rotational scan rates of the receivers of the communication equipments beyond practical limits when operating in the call-up mode of operation. As a result, by increasing the field of acceptance of the receivers when operating in the stand-by mode of operation, the maximum call-up time would be one minute or one complete rotation of the equipments operating in the stand-by mode which was described and assumed to be one revolution per minute in the context of the present embodiment of the present invention.

It can readily be appreciated that if the field of acceptance of the receivers operating in the stand-by mode of operation were only six degrees because of the required bandwidth and favorable signal-to-noise ratio used in voice communications, the resultant ratio of rotational speeds between the communication equipments in accordance with the concept and teaching of the present invention would be sixty to one with the result that if the practical limit of rotational speed of the equipments operating in the call-up mode were thirty revolutions per minute, the rotational speed of the cooperating equipments in the system operating in the stand-by mode of operation would be one-half revolution per minute, thus doubling the time to two minutes for maximum call-up time required to make initial contact and acquisition between two or more communications equipments operating in the system.

Accordingly, those knowledgeable in the art and familar with the problems involved in typical small angle communication systems will appreciate that the concept and teaching of the present invention provides firstly a mode of acquisition by reason of initial communication between several communication equipments in the system which can be accomplished within a determinable and established time.

Moreover, the teaching of the present invention enables the minimizing of such acquisition time by reason of affording the maximum angle of acceptance between the transmitters and receivers involved in the acquisition process. This is accomplished by relating an enlarged angle of acceptance in the acquisition mode to the other parameters of the communications system as are established by the requirements of signal-to-noise ratio during voice of other relatively broad bandwidth communication modes of operation when the angle of acceptance of the receiver must be significantly diminished.

The present invention is particularly desirable and adaptable to mobile units such as are installed on surface vessels or aircraft where the equipments may be moving relative to each other and are therefore to be acquired in initial communication contact from relative points of bearing which are unknown. Additionally, the present invention conceives successive modes of operation including a limited oscillatory sector scan which would compensate for a degree of overshoot as well as accommodating such relative movement between initially communicating equipments.

The present invention is so conceived as to be applicable to any communications system employing radiant energy which is transmitted and received by means at a relatively small angle, i.e. not onmidirectional. Accordingly, though not inherently limited to optical systems, the present invention is especially adaptable, useful and desirable for optical systems because such systems typically have a relatively small angle of transmission and acceptance. FIG. 2 illustrates in considerable more schematic detail the typical transmitter and receiver controls which may be employed in equipment of an optical communication system embodying the concept and teaching of the present invention.

With respect to FIG. 2, a head 100 is mounted on and with a movable transceiver unit not shown. In the head 100 is an aperture 101, a shutter 102 consisting of a metal blade or some other filter such as Mylar film, and an actuator 103 coupled to the shutter 102 so that the shutter 102 may be moved with respect to the aperture 101. A relay 104 is connected to the actuator 103 and the relay 104 receives an energizing voltage from an amplifier 105 and a sun detector 106. In this respect incident sunlight on the aperture 101 is excluded from reaching a bank of detector cells by means of the shutter 102.

Lying in close proximity to the shutter and aperture are four infra-red detection cells 107–110. The cells are biased from a source of supply 180 and the cell bias is adjusted automatically by an aperture servo 182 mechanically coupled to the cell bias supply 111. In addition the aperture servo controls the opening of aperture 101.

The outputs from cells 107–110 are coupled to amplifiers 111 to 114 respectively and the outputs of these amplifiers are coupled to amplifiers 115–118 respectively. Amplifiers 115 and 118 have coupled thereto a second input from a track logic circuit 119 contained in the scanner circuitry. The input from 119 to amplifiers 115 and 118 inhibits amplifiers 115 and 118 and thereby effectively cuts off cells 107 and 110 during communication. This cut-off is provided as will be explained later.

In order to develop a signal which may be used to control the direction in which the scanning head 100 is pointing the outputs from cells 107 and 108 and thereby respective amplifiers 115 and 116 are coupled to a summing amplifier 120 the output of which will comprise an A signal. Correspondingly the outputs from cells 109 and 110 and respective amplifiers 117 and 118 are coupled to a summation amplifier 121 the output of which will be referred to as the B signal. The outputs of amplifiers 120 and 121 are further coupled to a summing amplifier 122 the output of which will be referred to as the $A+B$ signal.

A bank of narrow-pass filters 123–130 is provided through which the signals corresponding to A, B, and $A+B$ are coupled. Filters 123, 125 and 128 are 300 cycle pass filters; filters 124, 126 and 129 are 5000 cycle pass filters; and filters 127 and 130 are 500–3000 cycle band pass filters.

At this point it is well to explain briefly that the transceiver head upon which the scanning head 100 is mounted is adapted to rotate in various modes. In one mode, corresponding to a call-up mode, the head is adapted to rotate at thirty revolutions per minute and during the time that the head is rotating at this speed the 5000 cycle filters 124, 126 and 129 are in the circuit. In another mode corresponding to stand-by the head is rotating at one revolution per minute and during this period of operation the 300 cycle filters 123, 125 and 128 are in the circuit. In order to switch the outputs A, B and $A+B$ to the proper filters a switching mechanism 131 is provided which has switch contacts 132, 133 and 134. Switch contact 134 is adapted to be switched between 300 cycle pass filter 123 and 5000 cycle pass filter 124; switch contact 133 between 300 cycle pass filter 125 and 5000 cycle pass filter 126; and switch contact 132 between 300 cycle pass filter 128 and 5000 cycle pass filter 129.

In addition, the A output from summation amplifier 120 is coupled to the 500–3000 cycle band pass filter 127 and the B output from summation amplifier 121 is coupled to the 500–3000 cycle band pass filter 130. In order to operate the switch contacts 132 through 134 automatically, a relay 135 is used which receives its actuating power from a supply through switch 136 which has a call-up and standby position.

The output of filters 123 and 124 are coupled to amplifier 140. The output of amplifier 140 is coupled through relay contacts 141 to a difference amplifier 142. Another input to difference amplifier 142 comprises the output of a summation amplifier 143 the input to which comprises the outputs of 500–3000 cycle band pass filters 127 and 130. The output of filter 127 will be referred to as the communication signal A and the output of filter 130 the communication signal B.

The output of the difference amplifier 142 is coupled to two trigger circuits 144 and 145. The trigger circuit 145 has a longer time constant than the trigger circuit 144 so that the trigger circuit 145 will not react to a signal received during the call-up mode of operation when the scanning head of either equipment is rotating at thirty revolutions per minute.

The outputs of filters 125 and 126 are coupled to a summing amplifier 146 and another input to the summing amplifier 146 comprises the output of filter 127 which is coupled thereto through relay contact 147.

The output of filters 128 and 129 are coupled to another summing amplifier 148 and in addition, the output of amplifier 130 is also coupled to amplifier 141 through relay contact 149. Relay contacts 147 and 149 are actuated simultaneously through the use of communication band relay 150. When the apparatus is being used in a communication mode i.e. when acquisition has been accomplished the communiaction band relay 150 is actuated and relay contacts 147 and 149 go to the ground as shown.

The input to summing amplifier 146 which comes from filter 127 is also coupled to a summing amplifier 155 the output which is coupled to a speaker or other user equipment. In addition, the output of filter 130 which is coupled to summing amplifier 148 is also coupled to the summing amplifier 155.

In order to energize the aperture servo 112 the outputs from summing amplifiers 146 and 148 are coupled to a summing amplifier 156 the output of which is coupled to an amplifier 157 and through relay contact 158 to the aperture servo 112. Relay contacts 141 and 158 are actuated by relay 159. The precise operation and timing of this relay is not gone into at this time however, in the operation of the system the times at which the various relays are actuated will be explained.

The output from summation amplifier 146 is also coupled to an amplifier 160 the output of which comprises one input to a modulator 161 and one input to the track logic circuitry 119. The output of summation amplifier 148 is coupled to an amplifier 162 the output of which comprises another input to modulator 161 and the track logic 119. The output of the modulator 161 is coupled back to the track logic circuitry 119 and also coupled to an amplifier 163 the output of which constitutes the track error signal. This track error signal is used to control the direction of rotation between predetermined limits of the head during the tracking and communication mode when the head is in automatic track operation.

Since the input of a communication signal from the transmitter to OR gate 165 disengages the wide band filters number 130 and 127 from the tracker system, means must be provided to prevent activation of this system during a period when a communication signal is being received, since under this condition the tracker is utilizing only the wide band information for tracking. Otherwise, accidental operation of the transmitter by application of a communication signal would disrupt tracking. The means provided consists of supplying the output from amplifier 140, which consists only of the $A+B$ tracker tones, to amplifier 170, the output of which is delayed in delay circuit 171 and is used to trigger transmitter cut-in relay 172. The transmitter cut-in relay 172 permits the transmitter communication circuitry to be used. In this system, therefore, the absence of a tracker tone, which occurs while a communication signal is being received, de-energizes the transmitter cut-in relay so that operation of the transmitter by a communication signal, which would disrupt the tracker system at this time, is impossible. This arrangement prevents transmission of a second communication signal while another communication signal is being received and insures that the received communication signal is not inadvertently interrupted. The purpose of the delay is to prevent the described descriptive operation from taking place during the momentary reception of tracker tone, which occurs during normal short pauses in speech.

OPERATION OF OPTICAL EQUIPMENT

Assuming that the equipment of FIG. 2 is in receive position, the receiver would be receptive to any tracker tones transmitted from a transmitter. In normal operation the communication system would provide for the transmission of tracker tones in the absence of any communication signal. A 5000 c.p.s. signal and a 300 cycle signal are transmitted as the tracker tones. During standby the 300 cycle signal is used as a tracker tone while during call-up the tracker tone is 5000 c.p.s. While communicating, tracker tones are not present. The communication band relay 150 is present in order that during transmission the receiver associated with the transmitter transmitting will not be in receive position. This prevents reception of back scatter i.e. returned atmospheric reflection of the transmitted communication signal from interferring with tracker operation.

Looking at the front end of the system i.e. toward aperture 101, a mechanical aperture is provided and is automatically controlled to regulate the signal amplitude. This aperture control is driven by the aperture control servo 182 whose input is the sum of the two tracker signals A and B. The output of the aperture servo also adjusts the detector cell bias automatically through the cell biasing means 180.

The detector cells 107 and 110 are prevented from overexposure to sum energy by the sun shutter 102. The sun shutter is activated by a signal from a sun detector photocell 106.

In the basic mode of operation, the equipment is scanning either very slowly, a little less than 1 revolution per minute if the equipment is operating in standby, or at a very fast rate, approximately 30 revolutions per minute if the equipment is operating in call-up. Upon reception of a signal, a first acquisition signal developed by trigger 144 is supplied to circuitry in the system, not shown, which causes the scan speed to drop to a low speed.

The first acquisition signal going to an acquisition sector scan control, not shown, locks a switch assembly therein whose position thus becomes a recorded indication of the bearing to the intercepted signal. This switch assembly, not shown, includes two limit switches so that when the bearing shaft of the scanner head reaches and actuates one of these switches it causes a scan speed and direction control to develop a direction-reversing voltage. When the bearing shaft is reversed, it continues until it actuates the other switch in this assembly, thus again reversing the direction of scan. Thus, once the first acquisition signal has been received the transceivers are scanning back and forth at a slow rate and through a sector angle whose bisector is a direct line of sight to the source of the signal which was intercepted.

If both stations intercept signals from each other at the initial crossing of signal paths, both stations will start sector scanning automatically. Another possibility is that the slow station will receive the fast station, without the reverse occurring. In such a case, the slow station will start scanning while the fast one will keep scanning continuously until it receives a signal from the slower unit, which has been sector scanning, at which time the second station will also start sector scanning automatically. When both stations are sector scanning, they are travelling at relatively low speeds. A signal received under this condition of operation is capable of operating the trigger which provides the second acquisition signal from trigger 145. Upon the second acquisition signal being developed, a relative bearing servo, not shown, is switched from the scan signal to the track signal, through a controller switch.

The track signal is a proportional control signal developed by the detector cells and subsequent circuitry to provide magnitude and sense of tracking area as will be explained. In that the track signal is applied to the bearing servo of the head it controls positioning of the servo in the transceivers. The transceivers are at this time therefore, tracking upon the other station. In the case where the other station has not picked up a signal during the time that the first station did, the first station will hold the transceiver pointed directly on a bearing of the other station. Therefore, when the other stations scans back again, it must pick up a signal and it will therefore also start tracking.

It is to be understood that the system is not only automatic but may be also used in a manual mode however, the automatic function then merely becomes manual so no explanation is deemed necessary. In addition, if the operator knows the approximate position of the station he wishes to contact, he can initiate a sector scan centered on a bearing to the other station and including as large an angle as he desires about this bearing.

If contact with another station is lost while tracking is taking place, the equipment does not resume scan. The optics are maintained on a true bearing to the last detected position of the other station. Thus, momentary loss of contact will not ordinarily necessitate a return to the scan and acquisition procedure.

The following explanation will refer to the development of the acquisition signals and the tracker signal. Referring to the transceiver, the received signal is picked up at the detector cell assembly 107–110 and during scanning all four elements are in active use. The four signals from the cell assemblies 107–110 pass through preamplifier states 111–114 and amplifier stages 115–118 respectively. The cut-off signal is connected to the amplifiers 115 and 118 and this signal is activated when the equipment is tracking and ready for communication as previously explained. At this time, the amplifiers 115 and 118 are cut-off so that the noise generated by cell elements 107 and 110 will not reduce the signal-to-noise ratio. During tracking elements 107 and 110 are not required since the focused energy covers only cell elements 108 and 109.

The output signals from cell elements 107 and 108 are added in summer 120 to form signal A. The output signals from cell elements 109 and 110 are added in summer 121 to form signal B. All four signals are added in a third summer to form the total signal $A+B$. This is done in summer 122. Signal A is coupled to the contact of the relay 135 and then through a 300 cycle filter or 5000 cycle filter 123 or 124 respectively. Signal B is likewise applied to filters 128 and 129. These narrow-band filters are suitable in that during the scanning and acquisitoin mode only 300 cycles or 5000 cycle tracker tone are in use and the narrow-band filters reduce the large band width considerably, thus improving the signal-to-noise ratio.

In addition signals A and B are also supplied to two communication band filters 127 and 130 respectively. The communication band comprises 500–3000 cycles per second. The output of these communication band filters 127 and 130 are supplied to a summer 143 to give a total communication band noise output, during scan, from all four detector cell elements. This signal is used here as a measure of miscellaneous noise received at the detector element. It automatically sets the threshold sensitivity in the acquisition signal circuitry.

Referring back, the total of signals $A+B$ is coupled to narrow-band filters 123 and 124 and this total signal is amplified and supplied to a difference amplifier 142. The previously described communication band noise signal from summer 143 is also supplied to this difference amplifier. A relative band width scale factor equalizes the two noise inputs to the difference amplifier during scanning. Thus, an increase of received noise level effects both inputs to the difference amplifier, so that there is no output. However, upon reception of a tracker tone signal from a communicating transmitter, the filters permit only one difference amplifier input to increase thereby resulting in a difference amplifier output. This can be readily seen in that the communication band is 500–3000 cycles while the tracker tones are either 300 or 5000.

The output from the difference amplifier 142 is coupled to a pair of trigger circuits 144 and 145. Any such output will operate the trigger circuit 144 which supplies the first acquisition signal. This signal is then used as previously described. The other trigger circuit 145 has a longer time constant, so it will only be activated by a relatively long signal, such as that received when the relative speed between the two transceivers in contact is slow enough to insure that tracking will be possible without over-shoot. The output of this trigger is the second acquisition signal and is used as was previously described.

The communication band signals A and B are supplied to the input of two summers 146 and 148 respectively. The other summer inputs are the narrow-band track tone signals A and B as shown. The communication band signals are applied to relay contacts 147 and 149 which are actuated by the communication band relay 150. This communication band relay has several functions. When actuated, it prevents the communication band signal from arriving at the summers 146 and 148 so that the summer output will contain only the track tone signals.

This is done for two purposes, one being to reduce noise during search and before communication. This noise reduction is accomplished by eliminating the noise existing in the 500–3000 cycle band, since signal information in this band will not be used during search and acquisition. For this purpose, the communication band relay 150 is actuated through OR gate 165 from a search signal which is the negation of a track-communicate signal and which is developed by a search signal relay 164 operated by the track logic circuitry 119.

The other function of the communication band relay 150 is to prevent the reception of back-scatter communication signals from interfering with tracking. For this purpose, the relay is operated through the same OR gate 165 by a communication signal originating in the transmitter section as shown. Thus, the back-scatter of the transmitter signal which occurs due to atmospheric reflection is rejected by filters and therefore cannot affect tracking.

The output signals from the two summers 146 and 148 comprise a tracker signal A and B respectively. These are supplied to the amplifiers 160 and 162 respectively and then to modulator 161 to produce an AC tracker error signal. The modulator output is amplified and applied to a relative bearing servo, not shown, which is used to control the direction in which the transceiver head is pointed. The tracker signal thus maintains the transceiver optics constantly pointing at the communication station.

Obviously many modifications and variations of the present invention are possible in the light of the above teachings. It is, therefore, to be understood that within the scope of the appended claims the invention may be practiced otherwise than as specifically described.

What is claimed is:

1. A communication system comprising:

at least one equipment for transmitting radiant energy within a small angle and at a determinable frequency;

at least one equipment for receiving said transmitted radiant energy within a limited angle of view;

means for driving said receiving equipment about two orthogonal axes;

means for driving said transmitting equipment through the solid angle of a sphere in the same period of time said receiving equipment is driven through its solid angle of view whereby transmission contact is completed between said equipments in a period of time not exceeding the full period of scan of said receiving equipment; and, means responsive to signals transmitted between said equipments for recording the relative bearing of said equipments relative to each other upon initial transmission contact.

2. A communication system as claimed in claim 1 and including means responsive to signals transmitted between equipments for causing said equipments to operate in a predetermined oscillatory sector scan substantially centered about said recorded relative bearing.

3. A communication system as claimed in claim 1 and including means discriminatingly responsive to the dwell time of the transmitted signal on the receiver during said sector scan for causing said equipments to operate in a tracking mode.

4. A communication system as claimed in claim 1 and including means responsive to said operation in a tracking mode for diminishing the field of view of said receiver whereby to improve the signal to noise ratio for transmitting intelligence between said equipments.

5. In combination with a rotatable electro-optical system, the improvement comprising the electric optical apparatus for controlling the rotation of the electro-optical system including:

detection means mounted on a rotative member for receiving and detecting energy;

means operatively connected to said detection means for forming an A signal and B signal, said A and B signals being determined by the location on the detection means where energy impinges;

summing means for forming another signal corresponding to a function of $A+B$ operatively coupled to said means for forming the signals corresponding to a function of A and B;

threshold level means operatively coupled to said means for forming signals corresponding to a function of $A+B$ as a function of A and B for establishing a threshold level corresponding to received noise at the detector;

difference means operatively coupled to said threshold level means;

another input to said difference means comprising the signal corresponding to a function of $A+B$;

trigger means operatively coupled to the output of said difference means and responsive to a predetermined output for controlling the speed of rotation of the rotative member;

modulator means operatively receiving signals corresponding to a function of A and B;

logic means operatively coupled to said modulator means for determining the error between signal A and signal B;

coupling means coupling said error signal from the modulator means to the rotative member for controlling the position of the rotative member between narrow limits as determined by the error between signals A and B.

6. The combination as set forth in claim 5 wherein:

said rotative member is caused to rotate in a standby mode and call-up mode, said standby mode and call-up mode differing substantially in speeds of rotation;

said trigger means coupled to the output of said difference means further comprising second trigger means for generating a first acquisition signal, said first acquisition signal corresponding to a detection of energy as said detection means on said rotative member is rotating in call-up mode;

said second trigger means being operative to produce a second acquisition signal corresponding to the detection of energy at said detection means when said rotative member is operating in the standby mode;

said second acquisition signal being operative to cause said rotative member to track automatically on the received detected energy.

7. In combination with a relatively rotatable member, an electro-optical acquisition system comprising;

means for receiving and detecting radiated energy;

output means operatively connected to said detection means for forming signals corresponding to A and B, said A and B signals being determined by the position on said detection means where energy impinges;

other output means operatively connected to said detection means for forming a signal corresponding to $A+B$;

filter means operatively connected to said A and B signal forming means for producing an output communication signal A and an output communication signal B;

summing means operatively connected to said filter means for producing the sum of said communication signals A and B;

difference amplifier means operatively receiving signals corresponding to $A+B$ and communication signal A and communication signal B;

the sum of communication signal A plus communication signal B establishing a threshold noise level as a reference for signal $A+B$ in said difference amplifier;

said difference amplifier producing an output when signal $A+B$ is greater than the sum of communication signal A and communication signal B;

trigger means operatively coupled to the output of said difference amplifier means for producing a first acquisition signal and a second acquisition signal;

said first acquisition signal being adapted to cause the relatively rotatable member to scan between predetermined limits at a predetermined scanning speed;

said second acquisition signal being adapted for connection to an automatic track relay to cause said relatively rotatable member to center on received energy at said detection means.

8. The combination of claim 7 and further including;

logic means operatively coupled to signal A and signal B for determining the error between signal A and signal B;

said output from said logic means being adapted for connection to said relatively rotatable member for determining the direction of rotation as dependent upon the error between detected signal A and signal B.

9. The combination of claim 8 and further including;

narrow-band filter means between the output of said A and B signal forming means and said logic means for increasing the signal to noise ratio of energy detected at said detection means.

10. The combination of claim 7 and wherein;

said trigger means includes first and second separate trigger means, said first separate trigger means producing the first acquisition signal when the relatively rotatably member is locating in a call-up mode;

said second separate trigger means producing a second acquisition signal when the relatively rotatable member is operating in a standby mode;

said first and second separate trigger means having different time constants so that the speed of rotation of said relatively rotatable member determines the forming of the first acquisition signal and a second acquisition signal.

11. In combination with a relatively rotatable member;

an electro-optical acquisition system comprising;

energy detection means comprising infra-red detection means;

first and second summing means operatively connected to receive signals generated by separate areas of said detection means;

said first summing means being operable to produce a signal corresponding to A;

said second summing means being operable to produce a signal corresponding to B;

third summing means operatively connected to said first and said second summing means for producing a signal corresponding to $A+B$;

narrow-band filter means operatively coupled to the output of said first summing means, second summing means and third summing means for improving the signal-to-noise ratio of energy received at said detection means;

an output from one of said filter means comprising a signal corresponding to communication signal A;

the output from another filter corresponding to a communication signal B;

fourth summing means for producing a sum corresponding to communication signal A plus communication signal B which is representative of received noise;

difference amplifier means operatively receiving the summation signal corresponding to communication signal A plus communication signal B and received energy corresponding to $A+B$, said difference amplifier means producing an output signal when signal $A+B$ is greater than communication signal A plus communication signal B;

trigger means operatively coupled to the output of said difference amplifier means for producing an output signal corresponding to received energy at said detection means which signal is used to control the relative rotatable member.

12. The combination of claim 11 and further including;

a further filter means producing an output corresponding to a track tone A;

an additional filter means producing an output corresponding to a track tone B;

said track tone A and B corresponding to received energy at different positions on said detection means;

tracking error determining means operatively receiving the outputs corresponding to track tone A and track tone B;

said track error means being operative to produce an output error track signal corresponding to the difference between track tone A and track tone B which signal is adapted for controlling said relative rotatable member when an acquisition signal has been generated.

13. The combination of claim 12 wherein;

said area of said detection means comprise four infrared detection cells spaced and numbered sequentially from one to four longitudinally, cells one and two being operable to produce signal A and cells three and four being operable to produce signal B.

14. The combination of claim 13 and further including;

logic means operatively coupled to said track error signal producing means for producing a signal which is used to inhibit the output from cells one and four when the acquisition signal is present.

15. The combination of claim 14 and further including;

shutter means in close proximity to said detector cell;

actuator means for said shutter means;

sum detector means operatively coupled to said actuator means for causing said actuator to position said shutter as determined by the amount of sun impinging upon said sum detector.

References Cited

UNITED STATES PATENTS

| | | | |
|---|---|---|---|
| 2,369,622 | 2/1945 | Toulov | 250—2 |
| 2,538,063 | 1/1951 | Touvet | 343—101 |
| 2,716,746 | 8/1955 | Howery | 343—7.4 |
| 2,964,629 | 12/1960 | Wiener | 343—117 |
| 3,095,566 | 6/1963 | Dethloff | 343—112.4 |
| 3,108,270 | 10/1963 | Fairbanks | 343—7.4 |
| 3,206,754 | 9/1965 | Morris | 343—117 |

RODNEY D. BENNETT, Primary Examiner

D. C. KAUFMAN, Assistant Examiner

U.S. Cl. X.R.

250—203; 343—100